United States Patent
Nogawa et al.

(10) Patent No.: US 9,714,835 B2
(45) Date of Patent: Jul. 25, 2017

(54) NAVIGATION SYSTEM, NAVIGATION SERVER, NAVIGATION CLIENT, AND NAVIGATION METHOD

(75) Inventors: Tadafumi Nogawa, Tokyo (JP); Kentaro Ishii, Wako (JP); Masahiro Washizu, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/003,394

(22) PCT Filed: Feb. 20, 2012

(86) PCT No.: PCT/JP2012/053994
§ 371 (c)(1),
(2), (4) Date: Sep. 5, 2013

(87) PCT Pub. No.: WO2012/120998
PCT Pub. Date: Sep. 13, 2012

(65) Prior Publication Data
US 2014/0005942 A1      Jan. 2, 2014

(30) Foreign Application Priority Data
Mar. 7, 2011      (JP) ................ 2011-049600

(51) Int. Cl.
*G01C 21/34*      (2006.01)
*G01C 21/32*      (2006.01)
*G09B 29/10*      (2006.01)

(52) U.S. Cl.
CPC ............. *G01C 21/34* (2013.01); *G01C 21/32* (2013.01); *G09B 29/106* (2013.01)

(58) Field of Classification Search
CPC ....... G01C 21/32; G01C 21/34; G09B 29/106
USPC ....... 701/533, 123, 537, 423, 414, 416, 420, 701/410; 340/988, 990; 455/412.1
See application file for complete search history.

(56) References Cited

U.S. PATENT DOCUMENTS

| | | | |
|---|---|---|---|
| 6,285,950 B1* | 9/2001 | Tanimoto | G01C 21/34 340/994 |
| 6,662,105 B1* | 12/2003 | Tada et al. | 701/420 |
| 6,707,421 B1* | 3/2004 | Drury et al. | 342/357.31 |
| 7,146,273 B2* | 12/2006 | Kadono et al. | 701/420 |

(Continued)

FOREIGN PATENT DOCUMENTS

| EP | 1102228 A2 | 5/2001 |
|---|---|---|
| EP | 1471329 A2 | 10/2004 |

(Continued)

OTHER PUBLICATIONS

European Search Report dated Dec. 1, 2014, 7 pages.
European Office Action dated Dec. 3, 2015, 6 pages.

*Primary Examiner* — Marthe Marc-Coleman
(74) *Attorney, Agent, or Firm* — Rankin, Hill & Clark LLP

(57) ABSTRACT

Provided is a system or the like capable of allowing a navigation-client to efficiently use a route search result by a navigation server, while accepting the existence of difference between map data used by each of the navigation server and the navigation-client. By having a common description such as coordinate values, it is able to make the navigation-client 200 efficiently use the route search result by the navigation server 100, while accepting the existence of difference of map data used by each of the navigation server 100 and the navigation-client 200.

20 Claims, 6 Drawing Sheets

(56) References Cited

U.S. PATENT DOCUMENTS

| | | | |
|---|---|---|---|
| 2006/0024431 A1* | 2/2006 | Tei | C03C 15/00 427/127 |
| 2008/0243377 A1* | 10/2008 | Kimita | G08G 1/0104 701/424 |
| 2008/0275629 A1* | 11/2008 | Yun | G01C 21/3492 701/118 |
| 2009/0005926 A1 | 1/2009 | Kaubisch | |
| 2010/0306245 A1* | 12/2010 | Kuwabara | G01C 21/3664 707/769 |
| 2011/0060495 A1* | 3/2011 | Kono | B60W 40/072 701/31.4 |
| 2011/0288762 A1* | 11/2011 | Kuznetsov | 701/443 |
| 2012/0173134 A1* | 7/2012 | Gutman | 701/400 |
| 2012/0173135 A1* | 7/2012 | Gutman | 701/408 |
| 2013/0018577 A1* | 1/2013 | Gooding | 701/423 |

FOREIGN PATENT DOCUMENTS

| | | | | |
|---|---|---|---|---|
| JP | 08-292056 | | 11/1996 | |
| JP | 10-0148540 A | * | 11/1996 | G01C 21/00 |
| JP | 10-148540 | | 6/1998 | |
| JP | 11-083516 | | 3/1999 | |
| JP | 11-083516 A | * | 3/1999 | G01C 21/00 |
| JP | 2001-021378 | | 1/2001 | |
| JP | 2001021378 A | * | 1/2001 | G01C 21/00 |
| JP | 2002-228468 | | 8/2002 | |
| JP | 2003-075178 | | 3/2003 | |
| JP | 2003-106851 | | 4/2003 | |
| JP | 2003106851 A | * | 4/2003 | G01C 21/00 |
| JP | 2003-329467 | | 11/2003 | |
| JP | 2004-070222 | | 3/2004 | |
| JP | 2009-019924 | | 1/2009 | |
| WO | 00/10029 A1 | | 2/2000 | |

\* cited by examiner

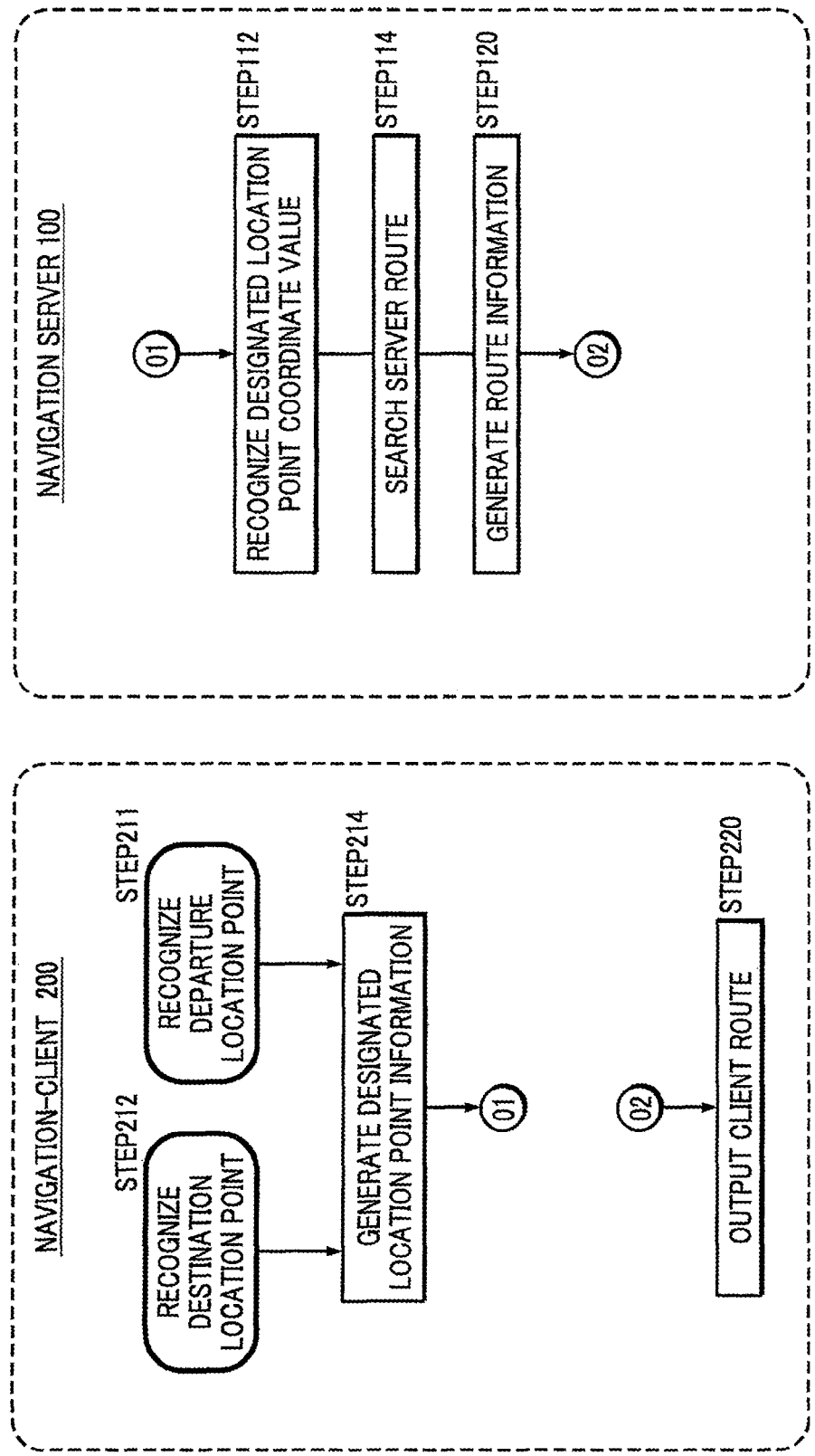

NAVIGATION SYSTEM, NAVIGATION SERVER, NAVIGATION CLIENT, AND NAVIGATION METHOD

TECHNICAL FIELD

The present invention relates to a navigation technology which guides a user to a designated position.

BACKGROUND ART

There has been proposed a technical method to have a navigation-client reproduce a route searched by a navigation server according to a communication between the navigation server and the navigation-client mounted in a vehicle or the like (refer to Patent Document 1).

In particular, link identification information for identifying a link constituting a part of a server route searched by the navigation server is transmitted to the navigation-client. According to this, information of coordinate rows of latitude and longitude expressing the link associated with the link identification information is read out from a storage unit, and a client route is searched and output based on the coordinate row information by the navigation-client. On such occasion, a client route which completely or almost completely matches the server route can be searched by performing interpolation processing for connecting discontinuous portions which cannot be supplemented only by the link identification information sent from the navigation server.

PRIOR ART DOCUMENTS

Patent Documents

Patent Document 1: Japanese patent application laid-open publication No. 2009-019924

SUMMARY OF THE INVENTION

Problems to be Solved by the Invention

However, there is a possibility that a client route extremely diverged from the server route is searched in a case where a server map data used by the navigation server and a client map data used by the navigation-client do not exactly match. The difference between the map data includes, for example, a difference of a format of describing method or the like of the link identification information as well as a difference of a range of the link covered.

In this regard, it is an object of the present invention to provide a system or the like capable of making the navigation-client to efficiently use a route search result by the navigation server, while accepting the existence of difference between map data used by each of the navigation server and the navigation-client.

Means for Solving the Problem

In order to solve the above problem, the navigation system of the present invention is a navigation system composed of a navigation server and a navigation-client, the navigation server comprising: a server storage unit configured to store a server map in which each location is described by a coordinate value including latitude and longitude and a link for route calculation is described by a group of coordinate values; a first server arithmetic processing element configured to receive designated location point information from the navigation-client, and to recognize each of two designated location points based on the designated location point information, and then by using a server map, to search for one or a plurality of server routes constituted by a plurality of links connecting the two designated location points; and a second server arithmetic processing element configured to transmit route information in which an arrangement manner of the server route searched by the first server arithmetic processing element is expressed by coordinated values, addressed to the navigation-client, the navigation-client comprising: a client storage unit configured to store a client map in which each location point is described by a coordinate value including latitude and longitude; an image output device; a first client arithmetic processing element configured to transmit the designated location point information to the navigation server; and a second client arithmetic processing element configured to receive the route information from the navigation server, and to output a client route superimposed on the client map to the image output device, the client route being a route having an arrangement manner in the client map which matches the arrangement manner expressed by the coordinate values included in the route information.

It is preferable that a travelling cost of a user of the navigation-client in each link is described by a designated map, the designated map being one of the server map and the client map, and a first designated arithmetic processing element, which is one of the first server arithmetic processing element and the first client arithmetic processing element that uses the designated map, is configured to preferentially recognize a location point, which is peripheral to a reference location point, the reference location point being at least one of a departure location point and a destination location point of the user, and which has a relatively low travelling cost of the user along a vicinity route constituted by one or a plurality of links connecting the reference location point and the location point, as at least one of the two designated location points.

It is preferable that the first designated arithmetic processing element is configured to search the server route which makes the user move in a direction which is relatively easier to move out from a designated area in which the designated location point is included or move into the designated area in a two-way traffic road, in a case where an exit or an entrance of the designated area is in contact with the two-way traffic road.

It is preferable that the client storage unit is configured to store a plurality of the client maps of different types and the second client arithmetic processing element is configured to selectively display the client map of the type designated by the user on the image output device.

The navigation server for solving the problem is a navigation server constituting the navigation system and characterized in comprising the server storage unit, the first server arithmetic processing element, and the second server arithmetic processing element.

The navigation-client for solving the problem is a navigation-client constituting the navigation system and characterized in comprising the client storage unit, the image output device, the first client arithmetic processing element, and the second client arithmetic processing element.

A navigation method of the present invention for solving the problem is a navigation method performed by a navigation server comprising a server storage unit configured to store a server map in which each location point is described by a coordinate value including latitude and longitude and in which a link for route calculation is described by a group of coordinate values, and by a navigation-client comprising a client storage unit configured to store a client map in which each location point is described by a coordinate value including latitude and longitude, and an image output device, the navigation method comprising: a step of the navigation-client transmitting designated location point information to the navigation server; a step of the navigation server recognizing each of two designated location points based on the designated location point information, and then searching one or a plurality of server routes constituted by a plurality of links connecting the two designated location points using the server map; a step of the navigation server transmitting route information expressing an arrangement manner of the server route by coordinate values, addressed to the navigation-client; and a step of the navigation-client making the image output device to output a client route superimposed on the client map, the client route being a route having an arrangement manner in the client map which matches the arrangement manner expressed by the coordinate values included in the route information.

It is preferable that a travelling cost of a user of the navigation-client in each link is described by a designated map, the designated map being one of the server map and the client map, and comprising a step of a designated device which is among the navigation server and the navigation-client that uses the designated map, preferentially recognizing a location point, which is peripheral to a reference location point, the reference location point being at least one of a departure location point and a destination location point of the user, and which has a relatively low travelling cost of the user along a vicinity route constituted by one or a plurality of links connecting the reference location point and the location point, as at least one of the two designated location points.

It is preferable to comprise a step of the designated device searching the server route which makes the user move in a direction which is relatively easier to move out from a designated area in which the designated location point is included or move into the designated area in a two-way traffic road, in a case where an exit or an entrance of the designated area is in contact with the two-way traffic road.

Here, an element of the present invention "recognizes" an information means to execute all kinds of information processing in order to prepare the information for other information processing such as the element receiving the information, search or reading out the information from a database or a memory, performing a designated arithmetic processing to basic information received or detected or the like to calculate, measure, estimate, set, determine, search, forecast etc., the information, actualizing the information by decoding a packet received or the like, furthermore, storing the information calculated or the like in the memory, or the like.

Effect of the Invention

According to the navigation system and the navigation method of the present invention, an arrangement manner f(p) of a position, posture, and a shape or the like of a server route (route 1) (dashed line) shown in the upper part of FIG. 6A, is extracted as route information as shown in the lower part of FIG. 6A in a form expressed by coordinate values for specifying each location point of a server map (map 1) (refer to FIG. 2/STEP 120).

As a result of reproducing the arrangement manner f(p) of the server route (route 1) shown in the upper part of FIG. 6B in a client map (map 2) in which each location point is described by coordinate values as shown in the lower part of FIG. 6B, a client route (route 2, shown in two-dotted line) is output. That is, image data of the server route (route 1) and image data of the client map (map 2) are superimposed so as to match their position, posture, and shape by the coordinate values which are the common description portions of both maps (map 1) and (map 2), and displayed on an output device 202.

As such, by the existence of the common description such as the coordinate values, it is able to make a navigation-client 200 effectively use the route search result by a navigation server 100 while allowing the existence of difference of map data used by each of the navigation server 100 and the navigation-client 200. That is, even if the server map and the client map differ in the format of description method or the like of the link identification information of a common link, it is able to make the navigation-client 200 efficiently use the route search result by the navigation server 100.

Moreover, a departure point $p_1$ is not itself recognized as a first designated location point $q_1$ which is the starting point of the server route, but a location point appropriate in view of travelling cost in an initial stage (a stage of travelling a vicinity route) of the user directing from the departure point $p_1$ to a destination point $p_2$, can be recognized as the first designated location point $q_1$ (refer to FIG. 3A, FIG. 3B).

Moreover, the destination point $p_2$ is not itself recognized as a second designated location point $q_2$ which is the terminal point of the server route, but a location point appropriate in view of the travelling cost in an ending stage (a stage of travelling a vicinity route) of the user directing from the departure point $p_1$ to the destination point $p_2$, can be recognized as the second designated location point $q_2$ (refer to FIG. 4A, FIG. 4B).

Therefore, it is able to smoothly guide the user to the destination point $p_2$ according to the client route as a result of reproducing the server route in the navigation-client 200.

BRIEF DESCRIPTION OF THE DRAWINGS

FIG. 2 is a view explaining the procedure of the navigation method of the embodiment of the present invention.

DETAILED DESCRIPTION OF THE PREFERRED EMBODIMENTS (Configuration of the Navigation System)

Figure 1:
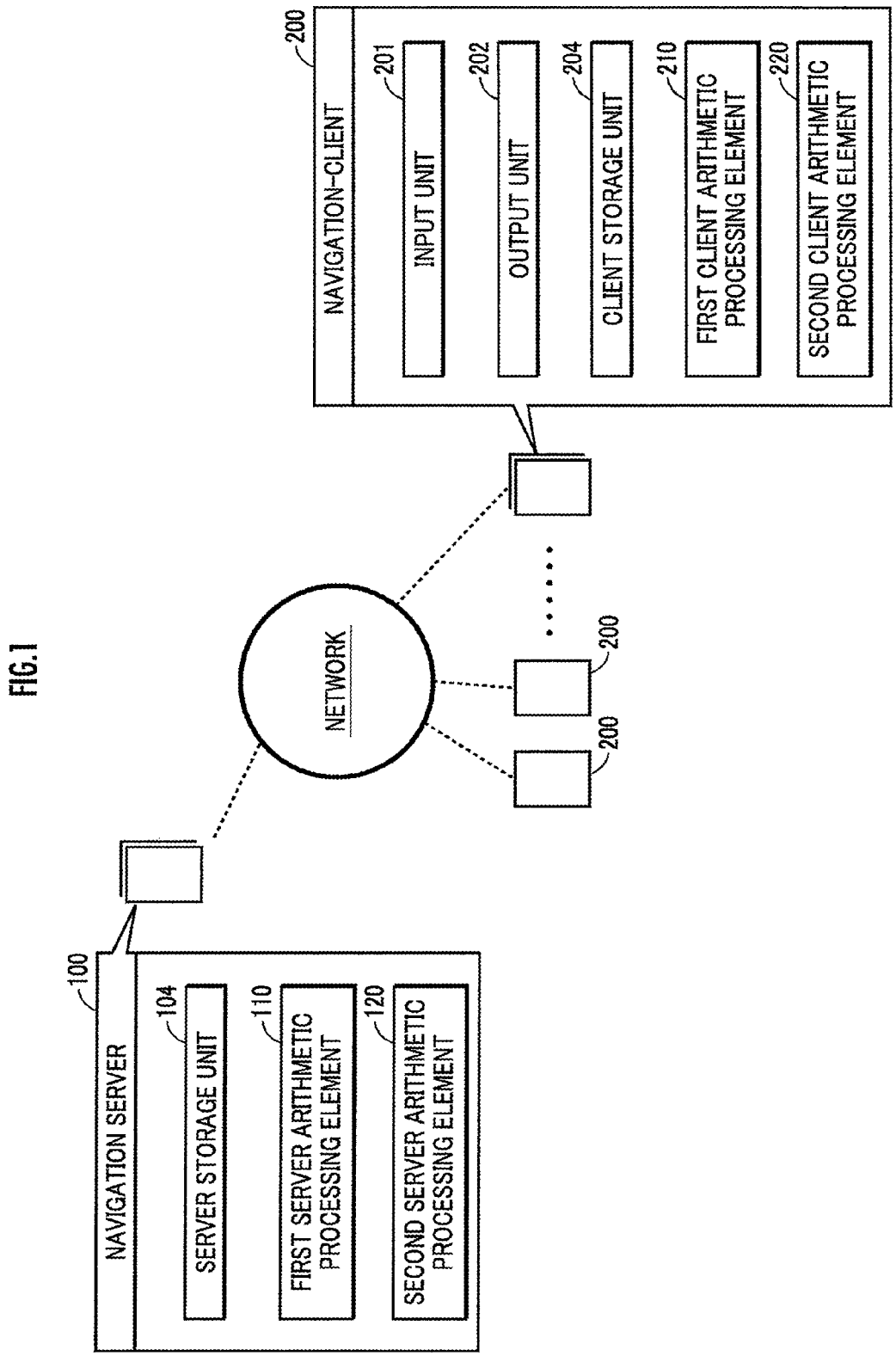
FIG. 1 is a configuration diagram of a navigation system of an embodiment of the present invention.

The navigation system illustrated in FIG. 1 is composed of a navigation server 100 and a navigation-client 200. Among a plurality of navigation-clients 200, at least a part of the navigation-clients 200 may function as the navigation server 100 temporary or constantly.

The navigation server 100 includes a server storage unit 104, a first server arithmetic processing element 110, and a second server arithmetic processing element 120. The navigation server 100 has communication function with the navigation-client 200 via a network, and is configured of one or a plurality of server computers. Internet, telephone lines network, or communication network using satellite broadcasting can be used as the network.

The server storing unit 104 is configured to store a server map in which each location point is described by latitude and longitude. In the server map, a link connecting two location points (traffic intersections or the like) a part from each other is described by a group of coordinate values or coordinate rows expressing a plurality of location points on the link. At least a part of the link may be described in relation to link identification information for identifying the link or a type of the road or the like constituted by the link. Moreover, a location range of a park, river, premises of facilities are described by coordinate rows expressing a plurality of location points on an outline of the range or a closed curve. Each range may be described in relation to a type of the object located in the range.

The first server arithmetic processing element 110 is configured to receive designated location point information from the navigation-client 200, and to recognize each of two designated location points based on the designated location point information. The first server arithmetic processing element 110 is configured to search one or a plurality of server routes composed of a plurality of links connecting the two designated location points by using the server map.

The second server arithmetic processing element 120 is configured to generate a route information in which an arrangement manner of the server route searched by the first arithmetic processing element 110 is expressed by coordinate values, and then transmit the route information to the navigation-client 200.

The first server arithmetic processing element 110 and the second server arithmetic processing element 120 are each configured by a programmable computer. An element of the present invention executes information arithmetic processing in charge means that the element reads out a program from the memory and is programmed to execute the information arithmetic processing in charge according to the program. The program is downloaded to the navigation server 100 through a network or installed through a storage medium. Each of the first server arithmetic processing element 110 and the second server arithmetic processing element 120 may be configured of a hardware, which is in part or in total physically independent and separate.

The navigation-client 200 includes an input unit 201, an output unit 202, a client storage unit 204, a first client arithmetic processing element 210, and a second client arithmetic processing element 220. The navigation-client 200 may be configured by a portable device, or may be configured as a device temporarily or constantly installed in a vehicle.

The input unit 201 is configured by a push-button type or touch-screen type interface, and enables information input operation such as designating and inputting or the like the destination location point or the like by the user. The input unit 201 may also be configured by a voice recognition device which recognizes a speech content of the user or the information intended to be input by analyzing a microphone or sound signals collected by the microphone.

The output unit 202 is configured by an image output device composed of liquid crystal panel or the like for displaying the client map or the like. When the input unit 201 is configured by a touch-screen type interface, touch type buttons are displayed on the image output device. Besides the image output device, the output unit 202 may also be configured by an audio output device which outputs audio signals related to image information displayed on the image output device.

The client storage unit 204 is configured to store a client map in which each location point is described by latitude and longitude. In the client map, a link connecting two location points apart from each other is described by a group of coordinate values or coordinate rows expressing a plurality of location points on the link. At least a part of the link may be described in relation to link identification information for identifying the link or a type of the road configured by the link. Moreover, a location range of a park, river, premises of facilities are described by coordinate rows expressing a plurality of location points on an outline of the range or a closed curve. Each range may be described in relation to a type of the object located in the range.

The client map may be the same map as the server map, or may be a map in which at least a part of the format differs from the server map.

The first client arithmetic processing element 210 is configured to generate designated location point information and then transmit the designated location point information to the navigation server 100. "The designated location point information" is information as the basis of recognition of each coordinate value of designated location points which becomes the two end points of the server route. The first client arithmetic processing element 210 is configured to measure a current position of the navigation client 200 based on GPS signals or the like received by a GPS receiver (not illustrated) installed in the navigation client 200. The first client arithmetic processing element 210 is configured to recognize a destination location point or the like input by the user through the input unit 201.

The second client arithmetic processing element 220 is configured to receive route information from the navigation server 100 and to designate a location point in the client map based on the coordinate values of the designated location point included in the route information. The second client arithmetic processing element 220 is configured to make the output unit 202 output a client route superimposed on the client map, the client route being a route which has a constant arrangement relation with the location point and which matches a shape of the server route included in the route information.

The first client arithmetic processing element 210 and the second client arithmetic processing element 220 are each configured of a programmable computer. The program is downloaded to the navigation-client 200 through a network or installed through a storage medium. Each of the first client arithmetic processing element 210 and the second client arithmetic processing element 220 may be configured of a hardware, which is in part or in total physically independent and separate.

(Navigation Method)

An embodiment of a navigation method performed by the navigation system of the above configuration is explained.

At the navigation-client 200, the first client arithmetic processing element 210 recognizes a destination location point (to be precise, the coordinate value thereof) $p_2$ of the user (FIG. 2/STEP 212). For example, a location point designated by the user through the input unit 201 is recognized as the destination location point $p_2$ in the client map displayed on the output unit 202.

Marks indicating a plurality of destination location point candidates are displayed on the client map, and a destination location point candidate which corresponds to one mark selected among the marks by the user through the input unit 201 may be recognized as the destination location point $p_2$. Among a plurality of POI (points of interest), a mark expressing a position of a POI classified in a preference segment which the user has registered in the navigation-client 200 through the input unit 201 in advance, may be displayed on the client map as a mark expressing the position of the destination location point candidate.

In addition, basic information such as a name, address, phone number, or e-mail address or the like of a facility or the like may be input or designated by the user through the input unit 201, and a location point related to the basic information in the client map may be recognized as the destination location point $p_2$.

A departure location point (to be precise, the coordinate value thereof) $p_1$ of the user is recognized by the first client arithmetic processing element 210 (FIG. 2/STEP 211). For example, a current location point of the navigation-client 200 at a time point the destination location point $p_2$ is recognized, is recognized as the departure location point $p_1$. In addition, similar to the destination location point $p_2$, a location point designated or the like by the user through the input unit 201 may be recognized as the departure location point $p_1$.

Then, "designated location point information" including coordinate values of each of the departure location point $P_1$ and the destination location point $p_2$ of the navigation-client 200 is generated by the first client arithmetic processing element 210 (FIG. 2/STEP 214), and then the designated location point information is sent to the navigation server 100 (FIG. 2/refer to arrow 01). Client identification information for identifying the navigation-client 200 is transmitted to the navigation server 100 accompanied to the designated location point information.

Next, at the navigation server 100, the first server arithmetic processing element 110 receives the designated location point information from the navigation-client 200 and recognizes each of the two designated location points based on the designated location point information (FIG. 2/STEP 112). For example, each of the departure location point $p_1$ and the destination location point $p_2$ included in the designated location point information is recognized as a first designated location point (to be precise, the coordinate value thereof) $q_1$ and a second designated location point (to be precise, the coordinate value thereof) $q_2$, respectively.

A location point in the periphery of the departure location point $p_1$ may be recognized as the first designated location point $q_1$. For example, a location point on the link in the shortest distance from the departure location point $p_1$ is recognized as the first designated location point $q_1$.

Moreover, among the location points in the periphery of the departure location point (reference location point) $p_1$, a location point in which a travelling cost of the user along a vicinity route configured by one or a plurality of links connecting the departure location point $p_1$ and such location point is relatively low, may be preferentially recognized as the first designated location point $q_1$ by the first server arithmetic processing element 110.

For evaluating the travelling cost, a server map in which the travelling cost of the user in each link is described is used. A value of a function having at least one of a travelling distance, travelling time required, and physical load of the user, as a variable, corresponds to the travelling cost. In a case the user travels by a vehicle, a value of a function having at least one of a travelling distance of the vehicle, required travelling time, physical load of the user (driving load of the vehicle), predicted fuel consumption amount, and required toll, as a variable, corresponds to the travelling cost.

The travelling time required for each link can be recognized from road traffic information obtained from outside information source. In addition to a measuring equipment disposed for measuring the traffic volume of users or vehicles of each link and the navigation-client 200 as a probe device for measuring a current position in time series, a road traffic information center or the like configured to collect measurement results from the measuring equipment or the probe device and then analyzing the collected information to predict the required travelling time in each link, corresponds to the outside information source. The navigation server 100 may configure the road traffic information center.

Figure 3A:
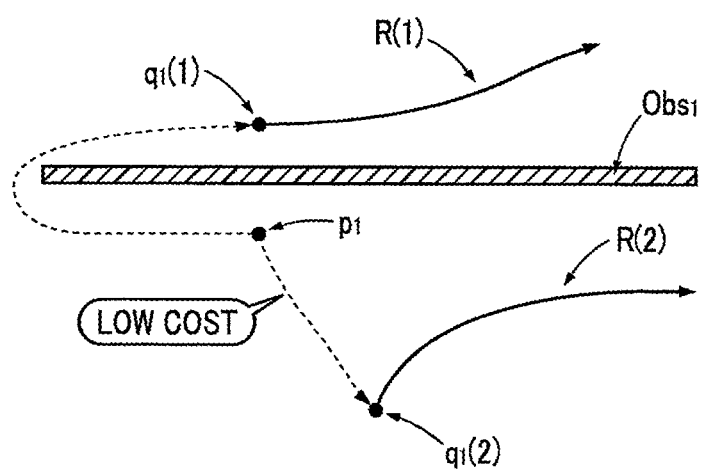
FIG. 3A and FIG. 3B are explanation views related to a method for setting a first designated location point of a server route.

As shown in FIG. 3A, in a case where a location point which is close to the departure location point $p_1$ in straight-line distance but located on an opposite side of the departure location point $p_1$ with reference to a first factor Obs 1 (river, forest, park, building structure or its premises) where the user cannot pass through, is recognized as the first designated location point $q_1(1)$, the travelling cost is evaluated high as for the travelling distance of the user along the vicinity route (dashed line) becomes long.

On the other hand, as also shown in FIG. 3A, in a case where a location point having a long straight-line distance from the departure location point $p_1$, but located on the same side of the departure location point $p_1$ viewed from the first factor Obs1, is recognized as the first designated location point $q_1(2)$, the travelling cost is evaluated low as for the travelling distance of the user along the vicinity route (dashed line) becomes short. Therefore, among the two location points $q_1(1)$ and $q_1(2)$, the latter is recognized as the first designated location point $q_1$.

Figure 3B:
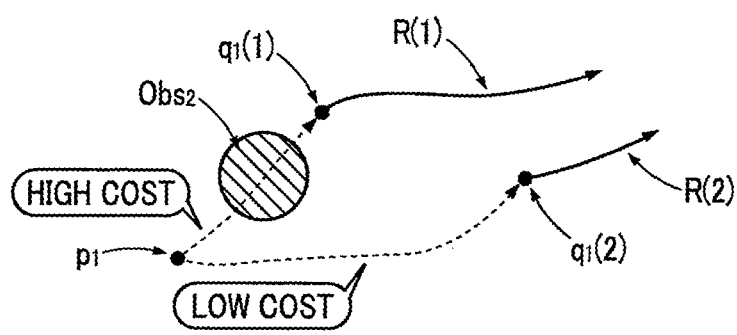

Furthermore, as shown in FIG. 3B, in a case the travelling distance of the user along the vicinity route (dashed line) is short, but the vicinity route passes through a second factor Obs2 (a road or an area with heavy traffic or slow traffic, a road with much slopes, a road which crosses a railroad crossing, or the like) which can be travelled by the user but difficult to travel, the travelling cost is evaluated high. The inclination manner of each link can be determined by using a server map in which each location point is described by a coordinate value including altitude in addition to latitude and longitude.

On the other hand, as also shown in FIG. 3B, in a case where the travelling distance of the user along the vicinity route (dashed line) is long, but the vicinity route does not pass through the second factor Obs2, the travelling cost is evaluated low. Therefore, among the two location points $q_1(1)$ and $q_1(2)$, the latter is recognized as the first designated location point $q_1$.

Figure 4A:
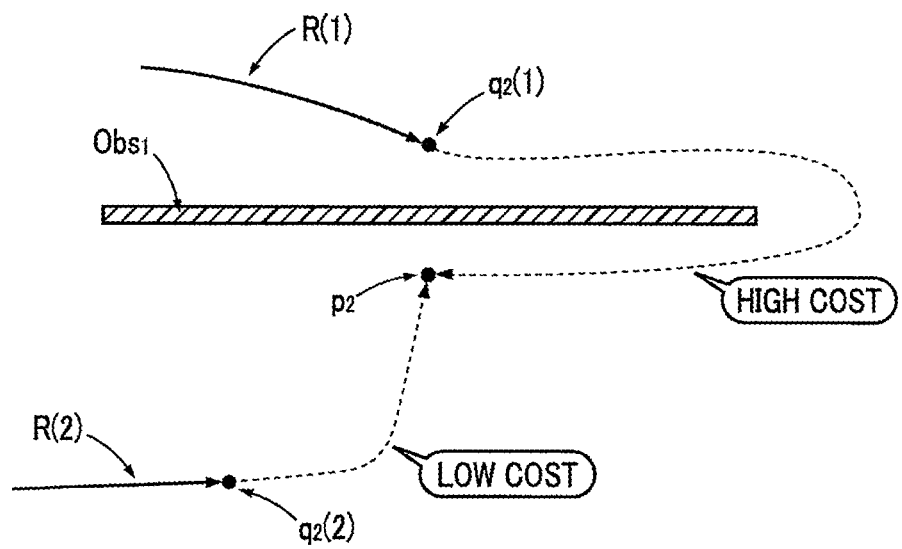
FIG. 4A and FIG. 4B are explanation views related to a method of setting a second designated location point of the server route.

Moreover, as shown in FIG. 4A, in a case where a location point which is close to the destination location point $p_2$ in straight-line distance, but is on the opposite side of the destination location point $p_2$ with reference to the first factor Obs1, is recognized as the second designated location point $q_2(1)$, the travelling cost is evaluated high as for the travelling distance of the user along the vicinity route (dashed line) becomes long. On the other hand, as also shown in FIG. 4A, in a case where a location point having a long straight-line distance to the destination location point $p_2$, but located on the same side of the destination location point $p_2$ viewed from the first factor Obs1, is recognized as the second designated location point $q_2(2)$, the travelling cost is evaluated low as for the travelling distance of the user along the vicinity route (dashed line) becomes short. Therefore, among the two location points $q_2(1)$ and $q_2(2)$, the latter is recognized as the second designated location point $q_2$.

Figure 4B:
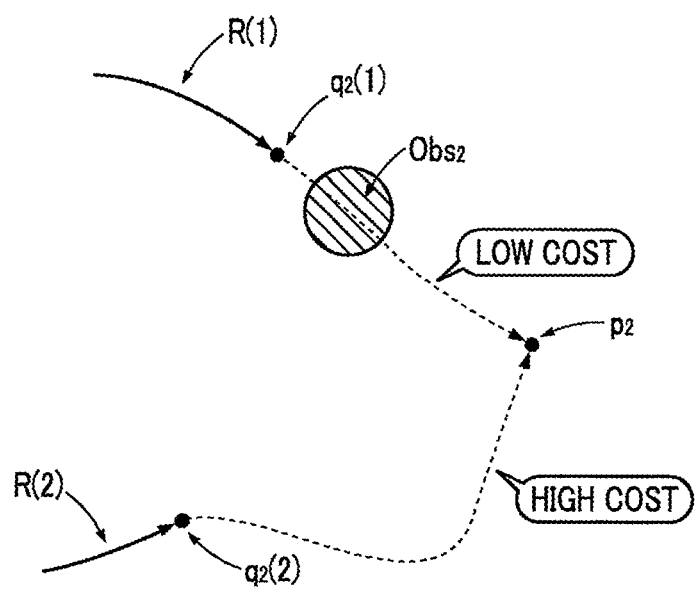

As shown in FIG. 4B, in a case where the travelling distance of the user along the vicinity route (dashed line) is short, but the vicinity route passes through a second factor Obs2, the travelling cost is evaluated high. On the other hand, as also shown in FIG. 4B, in a case where the travelling distance of the user along the vicinity route (dashed line) is long, but the vicinity route does not pass through the second factor Obs2, the travelling cost is evaluated low. Therefore, among the two location points $q_2(1)$ and $q_2(2)$, the latter is recognized as the second designated location point $q_2$.

Next, one or a plurality of server routes configured by a plurality of links connecting the first designated location point $q_1$ and the second designated location point $q_2$ are searched by the first server arithmetic processing element 110 using the server map (FIG. 2/STEP 114).

For example, the server route is searched on a policy to make the travelling cost to the first designated location point $q_1$ and the second designated location point $q_2$ becomes minimum. The type of travelling cost designated by the user through the input unit 201 is sent to the navigation server 100 from the navigation-client 200 together with the designated location point information (refer to FIG. 2/arrow 01), and the server route may be searched so that the travelling cost of the designated type becomes minimum.

Figure 5A:
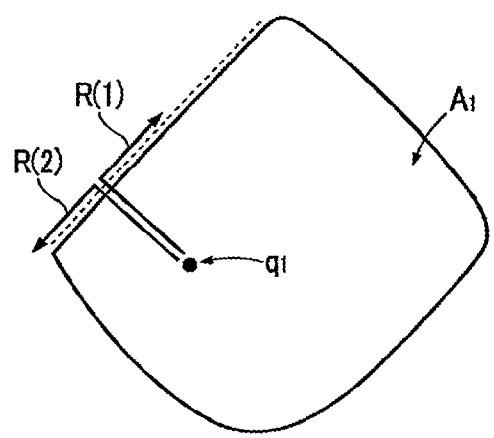
FIG. 5A and FIG. 5B are explanation views related to a searching method of a server route in a vicinity of the designated location point.

Specifically, as shown in FIG. 5A, in a case where an exit and entry of a first designated area $A_1$, in which the first designated location point $q_1$ is included, contacts a two-way traffic road (dashed line), a server route which makes the user move in a direction which is relatively easy to move out from the first designated area $A_1$ at the two-way traffic road is searched for. For example, in a case the two-way traffic road is a left-hand traffic road, a route R(2) which moves out from the first designated area $A_1$ by turning left is preferentially searched as the server route instead of a route R(1) which moves out from the first designated area $A_1$ by turning right. Contrary to this, in a case where the two-way traffic road is a right-hand traffic road, the other route R(1) is preferentially searched as the server route.

Figure 5B:
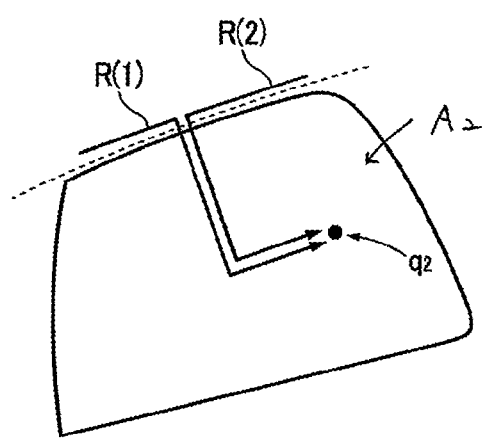
Figure 6A:
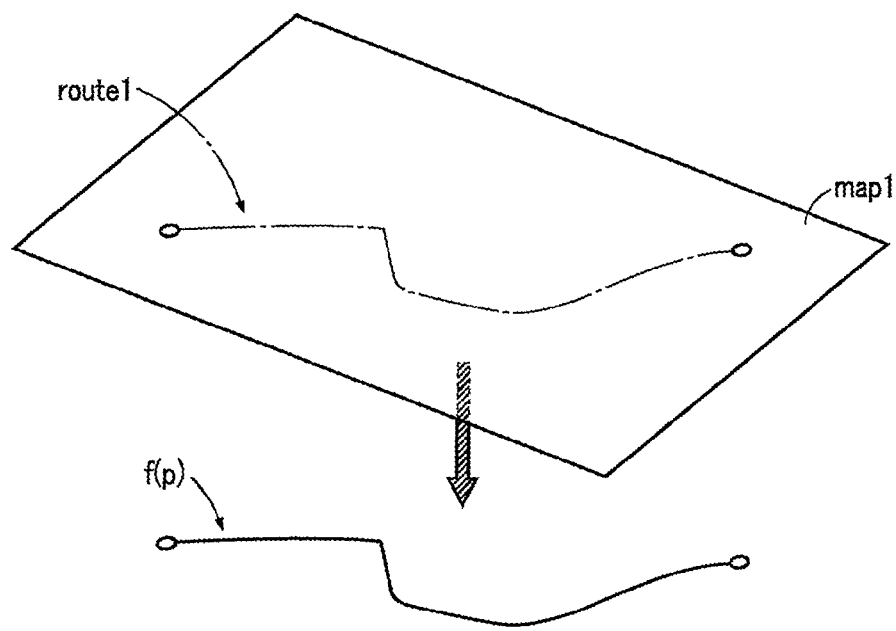
FIG. 6A and FIG. 6B are explanation views related to a reproduction method of a client route based on the server route.
Figure 6B:
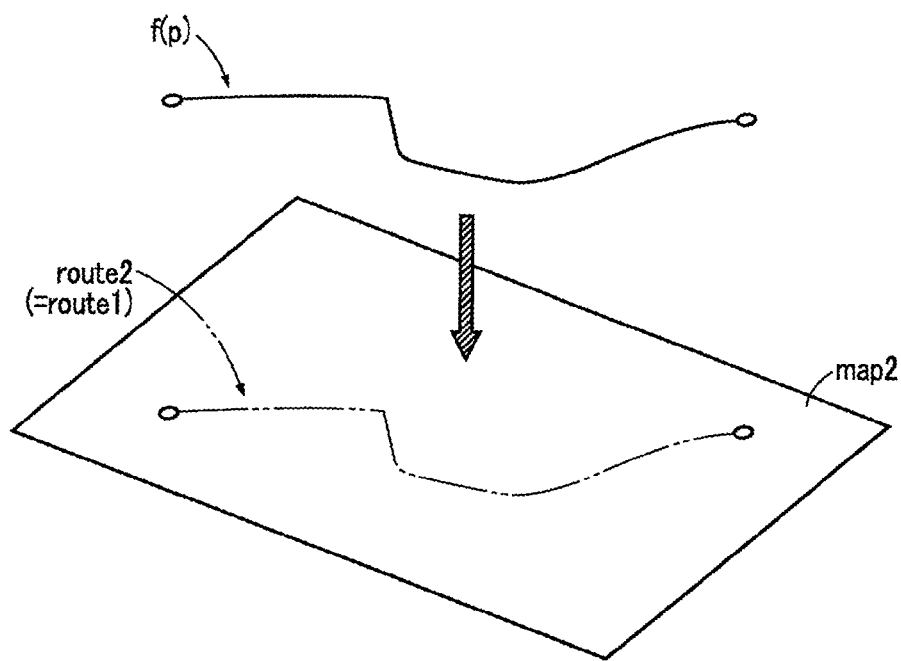

As shown in FIG. 5B, in a case where an exit and entry of a second designated area $A_2$, in which the second designated location point $q_2$ is included, contacts a two-way traffic road (dashed line), a server route which makes the user move in a direction which is relatively easy to move into the second designated area $A_2$ at the two-way traffic road is searched for. For example, in a case the two-way traffic road is a left-hand traffic road, a route R(2) which moves into the second designated area $A_2$ by turning left is preferentially searched as the server route instead of a route R(1) which moves into the second designated area $A_2$ by turning right. Contrary to this, in a case where the two-way traffic road is a right-hand traffic road, the other route R(1) is preferentially searched as the server route.

Next, "route information" in which the arrangement manner of the server route is expressed by coordinate values is generated by the second server arithmetic processing element 120 (FIG. 2/STEP 120), and then the route information is transmitted to the navigation-client 200 (FIG. 2/arrow 02) identified by client identification information annex to the designated location point information (FIG. 2/arrow 01).

The route information includes coordinate values of each of the plurality of location points on the server route including at least from the first designated location point $q_1$ to the second designated location point $q_2$. The density of the plurality of location points can be appropriately adjusted by taking into account a communication cost or the like of the route information. Moreover, the density of location points may differ by being high or low, such that a location point density in an area of high importance such as an entrance from an ordinary road to an express highway or an exit from the express highway to the ordinary road is made higher than other places.

Furthermore, the arrangement manner of the server route may be expressed in the route information by at least one location point on the server route, and in addition, by one or a plurality of functions $y=f(x)$ (x:latitude, y:longitude) defined with reference to the at least one location point and expressing a shape and a posture of the server route. By expressing at least a part of the arrangement manner of the server route including a plurality of location points by such function, the communication cost of the route information and the arithmetic processing load thereof are intended to be reduced.

The link information may include a level (high/low) of the travelling cost for each link and a designation of a display manner (color or brightness or the like) of each link according to the level of the travelling cost.

Then, at the navigation-client 200, the route information is received by the second client arithmetic processing element 220. Furthermore, a route having an arrangement manner in the client map which matches the arrangement manner expressed by the coordinate values included in the route information, is generated as the client route, and superimposed on the client map to be output by the output unit 202 (FIG. 2/STEP 220).

In a case the coordinate values of each of the plurality of location points on the server route are included in the route information, the plurality of the location points having such coordinate values are specified on the client map, and then drawing data of a line segment connecting the plurality of the location points are generated as the client route. The drawing data of the client route may be generated so that the output unit 202 displays each link based on a display manner according to at least one of the difference of the type of road and the travelling cost of each link, designated by the route information.

In addition, at least one location point on the server route and a location point having the coordinate values on the client map is specified in the route information, and then, drawing data which expresses the posture and shape by one or a plurality of functions $y=f(x)$ with reference to the location point, is generated as the client route.

A plurality of types of client maps may be stored in the client storage unit 204 and the type of client map designated by the user through the input unit 201 may be displayed on the output unit 202.

Other Embodiments of the Present Invention

According to the above embodiment, the server map corresponds to the "designated map" in which the travelling cost of the user of the navigation-client 200 in each link, is described and the navigation server 100 corresponds to the "designated device" using the designated map, and the first server arithmetic processing element 110 corresponds to the "first designated arithmetic processing element" using the designated map.

Alternatively, for at least a part of the navigation-clients 200, the client map may correspond to the "designated map" and the navigation-client 200 may correspond to the "designated device" and the first client arithmetic processing element 210 may correspond to the "first designated arithmetic processing element".

In such case, the departure location point $p_1$ or a location point in the periphery thereof is recognized as the first designated location point $q_1$ (refer to FIG. 3A, FIG. 3B), and the destination location point $p_2$ or a location point in the periphery thereof is recognized as the second designated location point $q_2$ (refer to FIG. 4A, FIG. 4B) by the first client arithmetic processing element 210.

Then, the designated location point information in which each of the first designated location point $q_1$ and the second designated location point $q_2$ is expressed by coordinate values, is generated by the first client arithmetic processing element 210 (refer to FIG. 2/STEP 214). And then, the first server arithmetic processing element 110 directly recognizes the first designated location point $q_1$ and the second designated location point $q_2$ from the designated location point information.

The invention claimed is:

1. A navigation system composed of a navigation server and a navigation-client, the navigation server comprising:
a server storage unit configured to store a server map in which each location point is described by a coordinate value including latitude and longitude, and a link for route calculation is described by a group of coordinate values;
a first server arithmetic processing element configured to receive designated location point information from the navigation-client, and to recognize each of two designated location points based on the designated location point information, and then by using a server map, to search for one or a plurality of server routes constituted by a plurality of links connecting the two designated location points; and
a second server arithmetic processing element including a designator for designating a display manner of each link according to a level of travelling cost, the display manner including one of color and brightness, and configured to transmit route information in which an arrangement manner of the server route searched by the first server arithmetic processing element is expressed by coordinate values, the route information also including the level of travelling cost of each link and the display manner of each link designated by the designator according to the level of travelling cost, addressed to the navigation-client, the navigation-client comprising:
a client storage unit configured to store a client map in which each location point is described by a coordinate value including latitude and longitude;
an image output device;
a first client arithmetic processing element configured to transmit the designated location point information to the navigation server; and
a second client arithmetic processing element configured to receive the route information from the navigation server, and to make the image output device display a client route for travel guidance superimposed on the client map, the client route being a route having an arrangement manner in the client map which matches the arrangement manner expressed by the coordinate values included in the route information and the level of the travelling cost of each link in the client route being reflected in the display manner of each link in the client route on the image output device, while the level of the travelling cost is not reflected in the display manner of each link not included in the client route, the display manner being designated by the route information, and the display manner of each link in the client route including one of color and brightness.

2. The navigation system according to claim 1,
wherein the travelling cost of a user of the navigation-client in each link is described by a designated map, the designated map being one of the server map and the client map, and
wherein a first designated arithmetic processing element, which is among the first server arithmetic processing element and the first client arithmetic processing element that uses the designated map, is configured to preferentially recognize a location point, which is peripheral to a reference location point, the reference location point being at least one of a departure location point and a destination location point of the user, and the location point having a relatively low travelling cost of the user along a vicinity route constituted by one or a plurality of links connecting the reference location point and the location point, as at least one of the two designated location points.

3. The navigation system according to claim 1,
wherein a first designated arithmetic processing element is configured to search the server route which makes the user move in a direction which is relatively easier to move out from a designated area including the designated location point or move into the designated area in a two-way traffic road, in a case where an exit or an entrance of the designated area is in contact with the two-way traffic road.

4. The navigation system according to claim 1,
wherein the client storage unit is configured to store a plurality of the client maps of different types, and
wherein the second client arithmetic processing element is configured to selectively display the client map of the type designated by the user on the image output device.

5. The navigation system according to claim 1, wherein the level of travelling cost of each link is set based on at least one of a travelling distance of each link and a travelling time required to traverse each link.

6. The navigation system according to claim 1, wherein the level of travelling cost of each link is set based on a travelling time required to traverse each link, and the travelling time required to traverse each link is set based on road traffic information for each link.

7. The navigation system according to claim 6, wherein the navigation server further comprises a road traffic information center configured to received collected measurement results measuring traffic volume of each link from at least one of associated measuring equipment and an associated probe device, and to calculate the travelling time required to traverse each link based on the collected measurement results.

8. A navigation server comprising:
a server storage unit configured to store a server map in which each location point is described by a coordinate value including latitude and longitude, and a link for route calculation is described by a group of coordinate values;
a first server arithmetic processing element configured to receive a designated location point information from a navigation-client, and to recognize each of two designated location points based on the designated location point information, and then by using a server map, to search for one or a plurality of server routes constituted by a plurality of links connecting the two designated location points; and a second server arithmetic processing element including a designator for designating a display manner of each link according to a level of travelling cost, the display manner including one of color and brightness, and configured to transmit route information in which an arrangement manner of the server route searched by the first server arithmetic processing element is expressed by coordinate values, the route information also including the level of travelling cost of each link and the display manner of each link designated by the designator according to the level of travelling cost, addressed to the navigation-client for display on an image output device as a client route for travel guidance superimposed on a client map, the client route being a route having an arrangement manner in the client map which matches the arrangement manner expressed by the coordinate values included in the route information and the level of the travelling cost of each link in the client route being reflected in the display manner of each link in the client route on the image output device, while the level of the travelling cost is not reflected in the display manner of each link not included in the client route, the display manner being designated by the route information, and the display manner of each link in the client route including one of color and brightness.

9. The navigation server according to claim 8, wherein the level of travelling cost of each link is set based on at least one of a travelling distance of each link and a travelling time required to traverse each link.

10. The navigation server according to claim 8, wherein the level of travelling cost of each link is set based on a travelling time required to traverse each link, and the travelling time required to traverse each link is set based on road traffic information for each link.

11. The navigation server according to claim 10, further comprising a road traffic information center configured to received collected measurement results measuring traffic volume of each link from at least one of associated measuring equipment and an associated probe device, and to calculate the travelling time required to traverse each link based on the collected measurement results.

12. The navigation-client according to claim 8, wherein the level of travelling cost of each link is set based on a travelling time required to traverse each link, and the travelling time required to traverse each link is set based on road traffic information for each link.

13. A navigation-client comprising:
a client storage unit configured to store a client map in which each location point is described by a coordinate value including latitude and longitude;
an image output device;
a first client arithmetic processing element configured to transmit designated location point information to a navigation server; and
a second client arithmetic processing element configured to receive route information from the navigation server, and to make the image output device display a client route for travel guidance superimposed on the client map, the client route being a route having an arrangement manner in the client map which matches an arrangement manner expressed by coordinate values included in the route information and a level of travelling cost of each link in the client route being reflected in a display manner of each link in the client route on the image output device, while the level of the travelling cost is not reflected in the display manner of each links not included in the client route, the display manner being designated by the route information, and the display manner of each link in the client route including one of color and brightness.

14. The navigation-client according to claim 13, wherein the level of travelling cost of each link is set based on at least one of a travelling distance of each link and a travelling time required to traverse each link.

15. A navigation method performed by a navigation server comprising a server storage unit configured to store a server map in which each location point is described by a coordinate value including latitude and longitude and in which a link for route calculation is described by a group of coordinate values, and by a navigation-client comprising a client storage unit configured to store a client map in which each location point is described by a coordinate value including latitude and longitude, and an image output device, the navigation method comprising:
a step of the navigation-client transmitting designated location point information to the navigation server;
a step of the navigation server recognizing each of two designated location points based on the designated location point information, and then searching one or a plurality of server routes constituted by a plurality of links connecting the two designated location points using the server map;
a step of the navigation server transmitting route information expressing an arrangement manner of the server route by coordinate values and including a level of travelling cost of each link and a designation of a display manner of each link according to the level of travelling cost, the display manner including one of color and brightness, addressed to the navigation-client; and
a step of the navigation-client making the image output device display a client route for travel guidance superimposed on the client map, the client route being a route having an arrangement manner in the client map which matches the arrangement manner expressed by the coordinate values included in the route information and the level of the travelling cost of each link in the client route being reflected in the display manner of each link in the client route on the image output device, while the level of the travelling cost is not reflected in the display manner of each link not included in the client route, the display manner being designated by the route information, and the display manner of each link in the client route including one of color and brightness.

16. The navigation method according to claim 15, wherein the travelling cost of a user of the navigation-client in each link is described by a designated map, the designated map being one of the server map and the client map, and
comprising a step of a designated device which is among the navigation server and the navigation-client that uses the designated map, preferentially recognizing a location point, which is peripheral to a reference location point, the reference location point being at least one of a departure location point and a destination location point of the user, and the location point having a relatively low travelling cost of the user along a vicinity route constituted by one or a plurality of links connecting the reference location point and the location point, as at least one of the two designated location points.

17. The navigation method according to claim 15, comprising a step of a designated device searching the server route which makes the user move in a direction which is relatively easier to move out from a designated area in which the designated location is included, or move into the designated area in a two-way traffic road, in a case where an exit or an entrance of the designated area is in contact with the two-way traffic road.

18. The navigation method according to claim 15, wherein the level of travelling cost of each link is set based on at least one of a travelling distance of each link and a travelling time required to traverse each link.

19. The navigation method according to claim 15, wherein the level of travelling cost of each link is set based on a travelling time required to traverse each link, and the travelling time required to traverse each link is set based on road traffic information for each link.

20. The navigation method according to claim 19, further comprising a step of receiving collected measurement results measuring traffic volume of each link from at least one of associated measuring equipment and an associated probe device, and calculating the travelling time required to traverse each link based on the collected measurement results.

\* \* \* \* \*